J. H. COOK.
SUPPORT OR BRACKET.
APPLICATION FILED JULY 1, 1908.

943,237.

Patented Dec. 14, 1909.

WITNESSES

INVENTOR
John H. Cook
BY
ATTORNEYS

UNITED STATES PATENT OFFICE.

JOHN H. COOK, OF NEW YORK, N. Y., ASSIGNOR TO HENRY B. NEWHALL, OF PLAINFIELD, NEW JERSEY.

SUPPORT OR BRACKET.

943,237.          Specification of Letters Patent.        Patented Dec. 14, 1909.

Application filed July 1, 1908. Serial No. 441,280.

*To all whom it may concern:*

Be it known that I, JOHN H. COOK, a citizen of the United States, and a resident of the borough of Brooklyn, in the county of Kings and State of New York, have invented certain new and useful Improvements in Supports or Brackets, of which the following is a specification.

This invention relates to brackets or supports for general application. One support or bracket may be used independently if desired to support any object. When the article to be supported has to be held at two or more points I preferably use two or more brackets.

In supporting a track, rail, guide or similar object from any suitable wall, prop or pillar, my bracket permits independent adjustment of portions of the particular object held by manipulating the nearest bracket or brackets.

For purposes of illustration I have shown my invention used to support the track or rail from which a door is supported, but it is to be understood that it is not limited to this or any other particular use.

Figure 2:
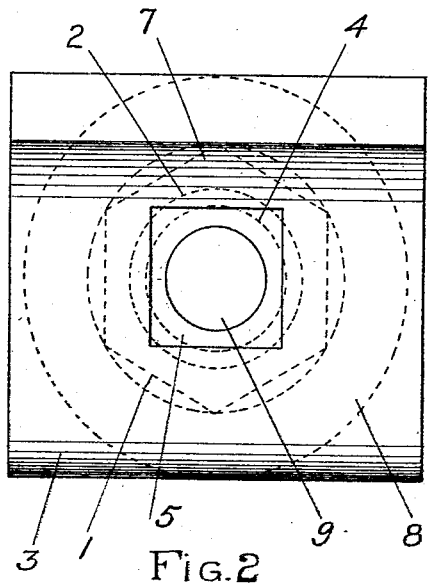
Figure 1:
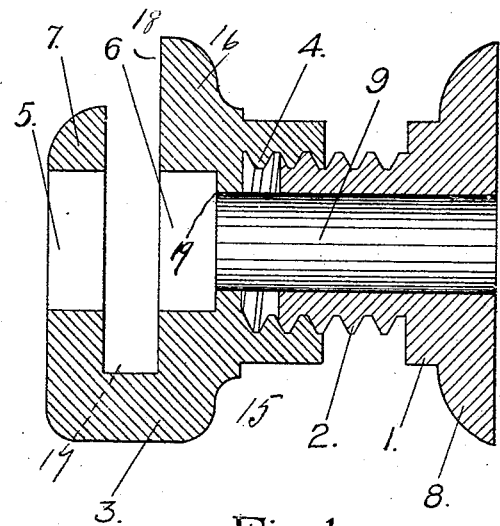
Figure 3:
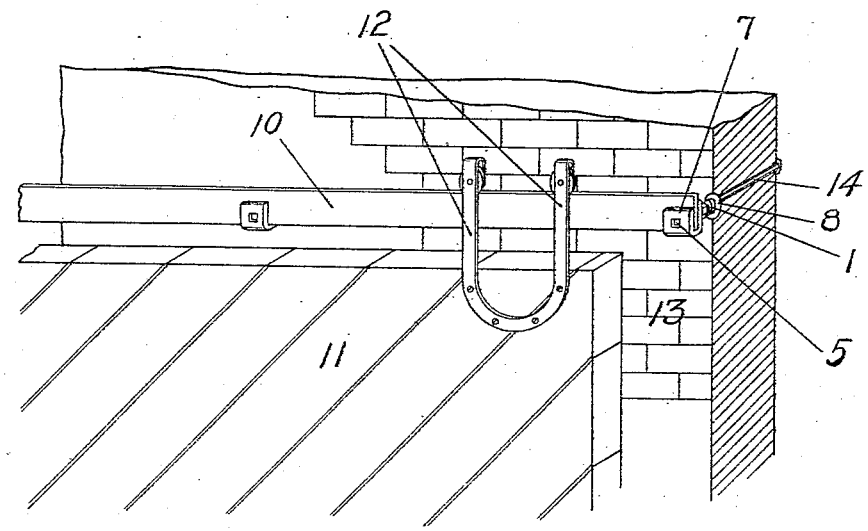

In the accompanying drawing showing an illustrative embodiment of this invention, and in which the same reference numerals refer to similar parts in the several figures, Figure 1 is a longitudinal vertical section. Fig. 2 is a front elevation. Fig. 3 is a perspective view, a part of the figure being in section, showing my invention secured to a wall and supporting a track.

In the illustrative embodiment of this invention 15 is a bracket or support formed of a plurality of parts preferably connected together by coöperating engaging surfaces of any kind. In the simplest form of my invention the bracket or support is formed of two members 8 and 3 and preferably provided with coöperating engaging surfaces in the form of male and female screw threads 2 and 4 respectively. In the device illustrated the male screw threads are located upon the base 8 and the female threads upon the head 3, though it is to be understood that this arrangement may be reversed and that any other suitable engaging surfaces may be used to connect the base 8 and the head 3 though I have found screw threads to be the most efficacious and inexpensive.

The head 3 may be formed of any desired shape or contour. It consists essentially of a plate 16, to which any object as a rail, guide, track or similar article may be held, a portion provided with coöperating engaging surfaces to coöperate with the other member of the bracket, and is also preferably provided with a lip 7 which may be secured to the plate 16 in any suitable manner, or cast integral with it as shown in Fig. 1.

The lip 7 is spaced from the plate 16 a sufficient distance to receive the track 10 or other article supported thereon and is provided with an aperture or opening 5 for the reception of the head of the bolt 14. As shown the track 10 is snugly received in the head 3 between the plate 16 and the lip 7 and rests upon the seat 17. It is of course understood that the article supported in the bracket may be secured from longitudinal movement in any suitable manner. In the drawing the track 10 supports a door 11 by means of a U-shaped bracket 12 having rollers which engage the top of the rail. This use of my invention, however, is merely illustrative.

I preferably arrange the openings 5 and 6 non-circular as shown to receive the non-circular head of a bolt (not shown), though this may be varied if desired. The opening 5 is to permit the head of the bolt to pass through the lip 7 and become seated against the shoulder 19 in the opening 6 in the plate 16. By this arrangement the head of the bolt is substantially held in the opening 6, leaving the opening 20 between the plate 16 and lip 7 substantially free for the reception of any object which is adapted to rest upon the seat 17. In this connection it is not to be understood that my invention is limited to the particular form of seat 17 shown or to be the contour of the opening 20 lying between the lip 7 and plate 16 as the same may be given any shape or form to coöperate with any particular shaped rail, track or other object to be supported by the bracket.

By my invention the track, hand rail or other object is supported freely without the necessity of drilling or boring it for the reception of the bolt which passes through the opening 9, for the head of the bolt is normally substantially seated in the non-circular opening 6 in the plate 16. This permits the purchaser of my brackets to locate them on a wall or other support so as to skip a joint in the wall, or a beam, chimney or any other obstruction which might be located back of its face, without the necessity of drilling or boring or re-drilling or reboring holes in the object supported to receive the bolt on which the bracket is mounted. In other words one of the results of my invention is that if previously drilled holes are in the track, hand rail or other object supported for the reception of the bolt, said holes do not govern the position of the support or supports which can be located entirely independent of such holes; and, moreover, as previously noted no holes in the article supported for the reception of the bolts is either necessary or desirable with my improved support.

By connecting the base and head by coöperating engaging surfaces I permit of an adjustment of these two elements and the member supported without removing it from the bracket.

When the structure to which the brackets are secured has or afterward develops, irregularities or inequalities, such irregularities or inequalities are compensated for by manipulating a portion of my bracket either to lengthen or shorten it.

In the use of my invention shown in the drawing where a plurality of brackets 15 are used to support the track 10 from the wall 13 any original or subsequently developed irregularity in the wall due to settling or other causes which would tend to bend or strain the track 10, can be instantly compensated for by causing a suitable tool to engage the non-circular surface 1 on the base 8 and rotate or partially rotate this latter member until the coöperating engaging surfaces 2 and 4 cause the bracket 15 to contract or expand sufficiently to true the track 10.

Having thus described this invention in connection with an illustrative embodiment thereof, to the details of which I do not desire to be limited, what is claimed as new and what it is desired to secure by Letters Patent is set forth in the appended claims.

1. The combination of a plurality of door hanger brackets each comprising a hollow base and a hollow head, having coöperating engaging surfaces on the head and base, said head having an upturned apertured lip and a base plate provided with a seat, means adapted to be secured to a fixed support and to pass through the base and head and be seated in the seat in said head, and a track held between the lip and plate and resting in the seat of the head, the parts being so arranged that the base and head may be adjusted to true the track without removing it from the bracket or brackets.

2. A bracket or support comprising a plurality of members having coöperating engaging surfaces permitting the bracket to be lengthened or shortened while in operative position, one of the members being provided with a lip the other member being provided with a recess to substantially entirely receive the means for supporting the bracket.

3. A bracket or support comprising a plurality of hollow members having coöperating engaging surfaces permitting the bracket to be lengthened or shortened while in operative position, one of said members having an upturned lip provided with an opening for the passage of a bolt, and also provided with a recess to receive the head of the bolt.

4. A bracket or support comprising a plurality of hollow members having coöperating engaging surfaces permitting the bracket to be lengthened or shortened while in operative position, and one of the members being provided with means for supporting an object upon one of the members without the aid of any locking means passing through or connecting with said supported object.

5. The combination of a bracket comprising a plurality of hollow members having coöperating engaging surfaces permitting them to be moved upon each other while in operative position, and means extending through the said members to support them, an object supported on one of the members and free of the supporting means upon which the hollow members are mounted.

6. The combination of a plurality of brackets, each bracket comprising a plurality of hollow members having coöperating engaging surfaces permitting them to be moved upon each other while in operative position and one of the hollow members being provided with means to support an object free from operative contact with the supporting bolt, a plurality of bolts one bolt to support each bracket, and an object supported by said brackets, and adapted to have free and independent movement in each bracket.

JOHN H. COOK.

Witnesses:
L. B. MEYER,
Z. B. COOK.